United States Patent
Westendorf et al.

(10) Patent No.: US 9,802,152 B2
(45) Date of Patent: Oct. 31, 2017

(54) SYSTEM AND METHODS FOR $CO_2$ SEPARATION

(71) Applicant: General Electric Company, Schenectady, NY (US)

(72) Inventors: Tiffany Elizabeth Pinard Westendorf, Troy, NY (US); Benjamin Rue Wood, Niskayuna, NY (US); Dan Hancu, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 51 days.

(21) Appl. No.: 14/969,643

(22) Filed: Dec. 15, 2015

(65) Prior Publication Data

US 2017/0165608 A1     Jun. 15, 2017

(51) Int. Cl.

| | | |
|---|---|---|
| *B01D 53/96* | (2006.01) | |
| *B01D 53/14* | (2006.01) | |
| *B01D 53/62* | (2006.01) | |
| *B01D 53/77* | (2006.01) | |
| *B01D 53/78* | (2006.01) | |

(52) U.S. Cl.
CPC ......... *B01D 53/62* (2013.01); *B01D 53/1425* (2013.01); *B01D 53/1475* (2013.01); *B01D 53/1493* (2013.01); *B01D 53/78* (2013.01); *B01D 2252/2041* (2013.01)

(58) Field of Classification Search
None
See application file for complete search history.

(56) References Cited

U.S. PATENT DOCUMENTS

| | | |
|---|---|---|
| 2,449,355 A | 9/1948 | Wiley et al. |
| 4,355,905 A | 10/1982 | St. Louis et al. |
| | (Continued) | |

FOREIGN PATENT DOCUMENTS

EP     0825919 B1     12/1999

OTHER PUBLICATIONS

Perry et al., "CO2 Capture Using Phase-Changing Sorbents", Energy & Fuels, 26 (4), Mar. 20, 2012, pp. 2528-2538.

(Continued)

*Primary Examiner* — Daniel Berns
(74) *Attorney, Agent, or Firm* — Pabitra K. Chakrabarti

(57) ABSTRACT

Systems and methods for separating carbon dioxide ($CO_2$) from a gas stream are provided. The system includes a reaction chamber 20, a pressurization unit 30, and a desorption unit 40. The reaction chamber 20 is configured to receive a liquid sorbent stream 14 and the gas stream 12, to react at least a portion of $CO_2$ in the gas stream 12 with the liquid sorbent and form an adduct stream 22. The pressurization unit 30 is configured to contact the adduct stream 22 with a pressurized $CO_2$ stream 24 and form a pressurized adduct stream 32 that includes a liquid $CO_2$ adduct. The desorption unit 40 is in fluid communication with the pressurization unit 30, and is configured to decompose at least a portion of the liquid $CO_2$ adduct to form a $CO_2$ stream 42 and a regenerated liquid sorbent stream 44.

8 Claims, 3 Drawing Sheets

(56) References Cited

U.S. PATENT DOCUMENTS

| | | | |
|---|---|---|---|
| 5,597,891 | A | 1/1997 | Nelson et al. |
| 6,790,929 | B2 | 9/2004 | Silvi et al. |
| 6,949,622 | B2 | 9/2005 | Silvi et al. |
| 7,053,168 | B2 | 5/2006 | Silvi et al. |
| 7,842,126 | B1 | 11/2010 | Dilmore et al. |
| 7,927,403 | B2 | 4/2011 | Versteeg et al. |
| 8,030,509 | B2 | 10/2011 | Perry et al. |
| 8,034,166 | B2 | 10/2011 | Asprion et al. |
| 8,318,116 | B2 | 11/2012 | Hu |
| 8,647,413 | B2 | 2/2014 | Soloveichik et al. |
| 8,709,367 | B2 | 4/2014 | Pinard Westendorf et al. |
| 2006/0165574 | A1 | 7/2006 | Sayari |
| 2010/0154639 | A1 | 6/2010 | Perry et al. |
| 2011/0308390 | A1 | 12/2011 | Perry et al. |
| 2012/0027664 | A1 | 2/2012 | Pinard Westendorf et al. |
| 2012/0171095 | A1 | 7/2012 | O'Brien et al. |
| 2012/0207659 | A1 | 8/2012 | Pinard Westendorf et al. |
| 2013/0052109 | A1 | 2/2013 | Davis et al. |
| 2013/0202517 | A1 | 8/2013 | Ayala et al. |
| 2013/0323148 | A1 | 12/2013 | Vipperla |
| 2013/0334463 | A1 | 12/2013 | Corry et al. |
| 2014/0099245 | A1 | 4/2014 | Hamad |
| 2014/0120015 | A1 | 5/2014 | Perry et al. |
| 2015/0004082 | A1 | 1/2015 | Singh et al. |

OTHER PUBLICATIONS

"Single-Screw Extruder Experiment", http://macro.lsu.edu/CoreCourses/MSweb4/IE/DooleyRheologyProcessing/EXTRUSION_EXP_MAN_11.pdf, 7 Pages, 2010.

Bacsik et al., "Temperature-induced Uptake of $CO_2$ and Formation of Carbamates in Mesocaged Silica Modified with n-propylamines", Langmuir, vol. No. 26, Issue No. 12, pp. 10013-10024, Jun. 15, 2010.

Perry et al., "Aminosilicone Solvents for $CO_2$ Capture", ChemSusChem vol. No. 3, Issue No. 8, pp. 919-930, Aug. 23, 2010.

"Cost and Performance Baseline for Fossil Energy Plants Volume 1: Bituminous Coal and Natural Gas to Electricity", National Energy Technology Laboratory, vol. No. 1, Part 1, pp. 1-125, Nov. 2010.

Cost and Performance Baseline for Fossil Energy Plants Volume 1: Bituminous Coal and Natural Gas to Electricity, National Energy Technology Laboratory, vol. No. 1, Part 2, pp. 126-250, Nov. 2010.

Cost and Performance Baseline for Fossil Energy Plants Volume 1: Bituminous Coal and Natural Gas to Electricity, National Energy Technology Laboratory, vol. No. 1, Part 3, pp. 251-375, Nov. 2010.

Cost and Performance Baseline for Fossil Energy Plants Volume 1: Bituminous Coal and Natural Gas to Electricity, National Energy Technology Laboratory, vol. No. 1, Part 4, pp. 376-500, Nov. 2010.

Cost and Performance Baseline for Fossil Energy Plants Volume 1: Bituminous Coal and Natural Gas to Electricity, National Energy Technology Laboratory, vol. No. 1, Part 5, pp. 501-600, Nov. 2010

Perry, "Carbon CaptureTechnology Development at GE", GE Global Research, 64 Pages, Feb. 22, 2013.

SYSTEM AND METHODS FOR CO$_2$ SEPARATION

BACKGROUND

The present disclosure relates to a system and methods for carbon dioxide (CO$_2$) separation from a gas stream. More particularly, the present disclosure relates to system and methods for liquid sorbent based CO$_2$ separation from a gas stream using a pressurized CO$_2$ stream.

Power generating processes that are based on combustion of carbon containing fuel typically produce CO$_2$ as a byproduct. It may be desirable to capture or otherwise separate the CO$_2$ from the gas mixture to prevent the release of CO$_2$ into the environment and/or to utilize CO$_2$ in processes such as unconventional oil and gas production.

Some known techniques have been deployed to reduce the emission of the CO$_2$ from an exhaust gaseous medium to the environment. Such known techniques include use of adsorbents, molecular filters or membranes, and absorber systems for removal of CO$_2$ from the exhaust stream.

Some phase changing amino siloxane-based processes have been explored for removing CO$_2$ from the gas streams. A number of deficiencies may be preventing wider adoption of this type of technology. For example, some amino siloxanes form a solid intermediate product upon exposure to CO$_2$. The transportation of solid intermediate product formed by the amino siloxanes and CO$_2$ can present technical and operability challenges for a commercial scale CO$_2$ capture process. To avoid this problem, some amino siloxane-based CO$_2$ capture methods utilize a co-solvent to suppress carbamate solid formation, which may greatly reduce absorbing capacity, as compared to the theoretical capacity of the amino siloxanes. Moreover, overall energy consumption in the process may be high, due in large part to the need for heating and evaporation of co-solvents.

Thus, there is a need for efficient systems and methods for separation of CO$_2$. Further, there is a need for efficient systems and methods for phase changing liquid sorbent-based separation of CO$_2$.

BRIEF DESCRIPTION

In accordance with some aspects, a system for separating carbon dioxide (CO$_2$) from a gas stream is provided. The system includes a reaction chamber, a pressurization unit, and a desorption unit. The reaction chamber is configured to receive a liquid sorbent stream and the gas stream, wherein the reaction chamber is configured to react at least a portion of CO$_2$ in the gas stream with the liquid sorbent to form an adduct stream including a solid CO$_2$ adduct. The pressurization unit is in fluid communication with the reaction chamber, and is configured to contact the adduct stream with a pressurized CO$_2$ stream, thereby liquefying at least a portion of the solid CO$_2$ adduct and forming a pressurized adduct stream that includes a liquid CO$_2$ adduct. The desorption unit is in fluid communication with the pressurization unit, and is configured to receive the pressurized adduct stream, and is configured to decompose at least a portion of the liquid CO$_2$ adduct to form a CO$_2$ stream and a regenerated liquid sorbent stream.

In accordance with some aspects, a method for separating carbon dioxide (CO$_2$) from a gas stream is provided. The method includes contacting a liquid sorbent stream with the gas stream, reacting at least a portion of CO$_2$ in the gas stream with the liquid sorbent stream to form an adduct stream that includes a solid CO$_2$ adduct. The method further includes contacting the adduct stream with a pressurized CO$_2$ stream, thereby liquefying at least a portion of the solid CO$_2$ adduct and forming a pressurized adduct stream that includes a liquid CO$_2$ adduct, and heating the pressurized adduct stream to decompose at least a portion of the liquid CO$_2$ adduct to form a CO$_2$ stream and a regenerated liquid sorbent stream.

In accordance with some aspects, a method for separating carbon dioxide (CO$_2$) from a gas stream is provided. The method includes contacting a liquid sorbent stream with the gas stream, reacting at least a portion of CO$_2$ in the gas stream with the liquid sorbent stream to form an adduct stream that includes a solid CO$_2$ adduct. The method includes contacting the adduct stream with a pressurized CO$_2$ stream, thereby liquefying at least a portion of the solid CO$_2$ adduct and forming a pressurized adduct stream that includes a liquid CO$_2$ adduct, and pre-heating the pressurized adduct stream via heat exchange with a regenerated liquid sorbent stream to form a pre-heated pressurized adduct stream and a cooled regenerated liquid sorbent stream. The method further includes heating the pre-heated pressurized adduct stream to decompose at least a portion of the liquid CO$_2$ adduct to form a CO$_2$ stream and the regenerated liquid sorbent stream, pressurizing at least a portion of the CO$_2$ stream to form the pressurized CO$_2$ stream and recirculating the pressurized CO$_2$ stream for contacting with the adduct stream, and recirculating at least a portion of the cooled regenerated liquid sorbent stream to the reaction chamber.

Other embodiments, aspects, features, and advantages of the invention will become apparent to those of ordinary skill in the art from the following detailed description, the accompanying drawings, and the appended claims.

BRIEF DESCRIPTION OF THE DRAWING FIGURES

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include systems and methods suitable for CO$_2$ separation. Some embodiments include systems and methods for high efficiency and cost-effective CO$_2$ separation from a gas stream using liquid sorbents and pressurized CO$_2$ stream. In some embodiments, the systems for CO$_2$ separation include a reaction chamber, a pressurization unit, and a desorption unit. In some embodiments, the methods include reacting at least a portion of CO$_2$ in the gas stream with the liquid sorbent, pressurizing and liquefying at least a portion of the adduct stream that is formed using a CO$_2$ stream, and heating to regenerate the liquid sorbent. These systems and methods may advantageously result in one or more of reduced materials and reduced capital cost, increased efficiency, simplified $CO_2$ capture process, or reduced overall footprint of the system.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In some instances, the approximating language may correspond to the precision of an instrument for measuring the value. Further, throughout the specification and claims, range limitations may be combined and/or interchanged; such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Figure 1:
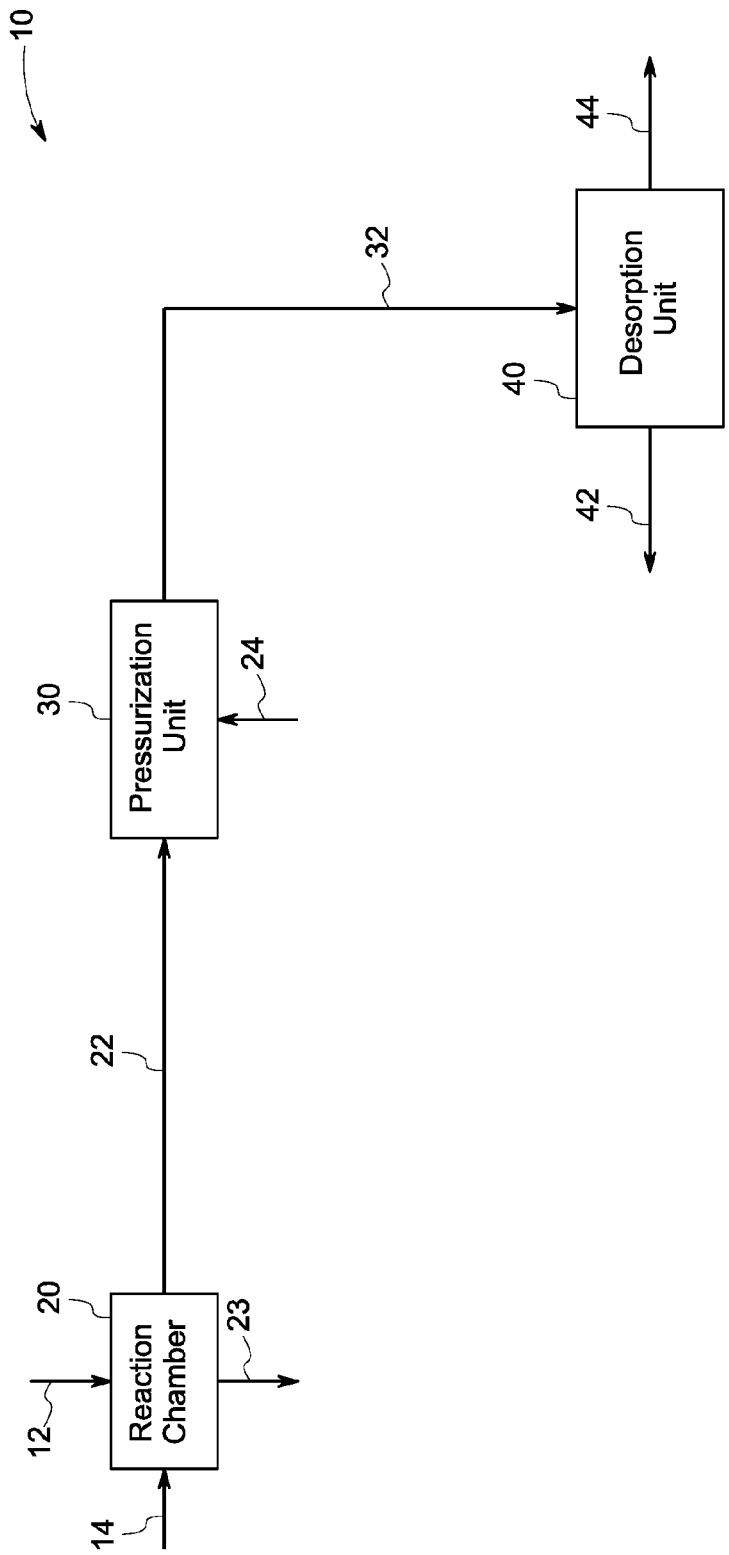
FIG. 1 is a schematic illustration of a system for CO$_2$ separation from a gas stream, in accordance with one embodiment of the invention.

In some embodiments, as shown in FIG. 1, a system 10 for separating carbon dioxide ($CO_2$) from a gas stream 12 is provided. The system 10 includes a reaction chamber 20, a pressurization unit 30, and a desorption unit 40. The reaction chamber 20 is configured to receive a liquid sorbent stream 14 and the gas stream 12, and to react at least a portion of $CO_2$ (not shown) in the gas stream 12 with the liquid sorbent to form an adduct stream 22 including a solid $CO_2$ adduct (not shown). The pressurization unit 30 is in fluid communication with the reaction chamber 20, and is configured to contact the adduct stream 22 with a pressurized $CO_2$ stream 24, thereby liquefying at least a portion of the solid $CO_2$ adduct and forming a pressurized adduct stream 32 that includes a liquid $CO_2$ adduct (not shown). The desorption unit 40 is in fluid communication with the pressurization unit 30, and is configured to receive the pressurized adduct stream 32, and is configured to decompose at least a portion of the liquid $CO_2$ adduct to form a $CO_2$ stream 42 and a regenerated liquid sorbent stream 44.

In accordance with some aspects, a method for separating carbon dioxide ($CO_2$) from the gas stream 12 using the system 10 is provided. The method includes contacting the liquid sorbent stream 14 with the gas stream 12 in the reaction chamber 20, and reacting at least a portion of $CO_2$ in the gas stream 12 with the liquid sorbent stream 14 to form the adduct stream 22 that includes the solid $CO_2$ adduct. The method further includes contacting the adduct stream 22 with the pressurized $CO_2$ stream 24 in the pressurization unit 30, thereby liquefying at least a portion of the solid $CO_2$ adduct and forming a pressurized adduct stream 32 that includes the liquid $CO_2$ adduct, and heating the pressurized adduct stream 32 in the desorption unit 40 to decompose at least a portion of the liquid $CO_2$ adduct to form the $CO_2$ stream 42 and the regenerated liquid sorbent stream 44.

The term "gas stream" as used herein refers to a gas mixture, which may further include one or both of solid and liquid components. In some embodiments, the gas stream 12 is a product from a combustion process, a gasification process, a landfill, a furnace, a steam generator, a boiler, or combinations thereof. In one embodiment, the gas stream 12 includes a gas mixture emitted as a result of the processing of fuels, such as, natural gas, biomass, gasoline, diesel fuel, coal, oil shale, fuel oil, tar sands, and combinations thereof. In some embodiments, the gas stream 12 includes a gas mixture emitted from a gas turbine. In some embodiments, the gas stream 12 includes syngas generated by gasification or a reforming plant. In some embodiments, the gas stream 12 includes a flue gas. In particular embodiments, the gas stream 12 includes a gas mixture emitted from a coal or natural gas-fired power plant.

As noted earlier, the gas stream 12 includes carbon dioxide. In some embodiments, the gas stream 12 further includes one or more of nitrogen, oxygen, or water vapor. In some embodiments, the gas stream 12 further includes impurities or pollutants, examples of which include, but are not limited to, nitrogen oxides, sulfur oxides, carbon monoxide, hydrogen sulfide, unburnt hydrocarbons, particulate matter, and combinations thereof. In some embodiments, the gas stream 12 is substantially free of the impurities or pollutants. In some embodiments, the gas stream 12 includes nitrogen, oxygen, and carbon dioxide. In some embodiments, the gas stream 12 includes nitrogen and carbon dioxide. In some embodiments, the gas stream 12 includes carbon monoxide. In some embodiments, the gas stream 12 includes syngas.

In some embodiments, the amount of impurities or pollutants in the gas stream 12 is less than 50 mole percent. In some embodiments, the amount of impurities or pollutants in the gas stream 12 is in a range from about 10 mole percent to about 20 mole percent. In some embodiments, the amount of impurities or pollutants in the gas stream 12 is less than 5 mole percent.

Figure 2:
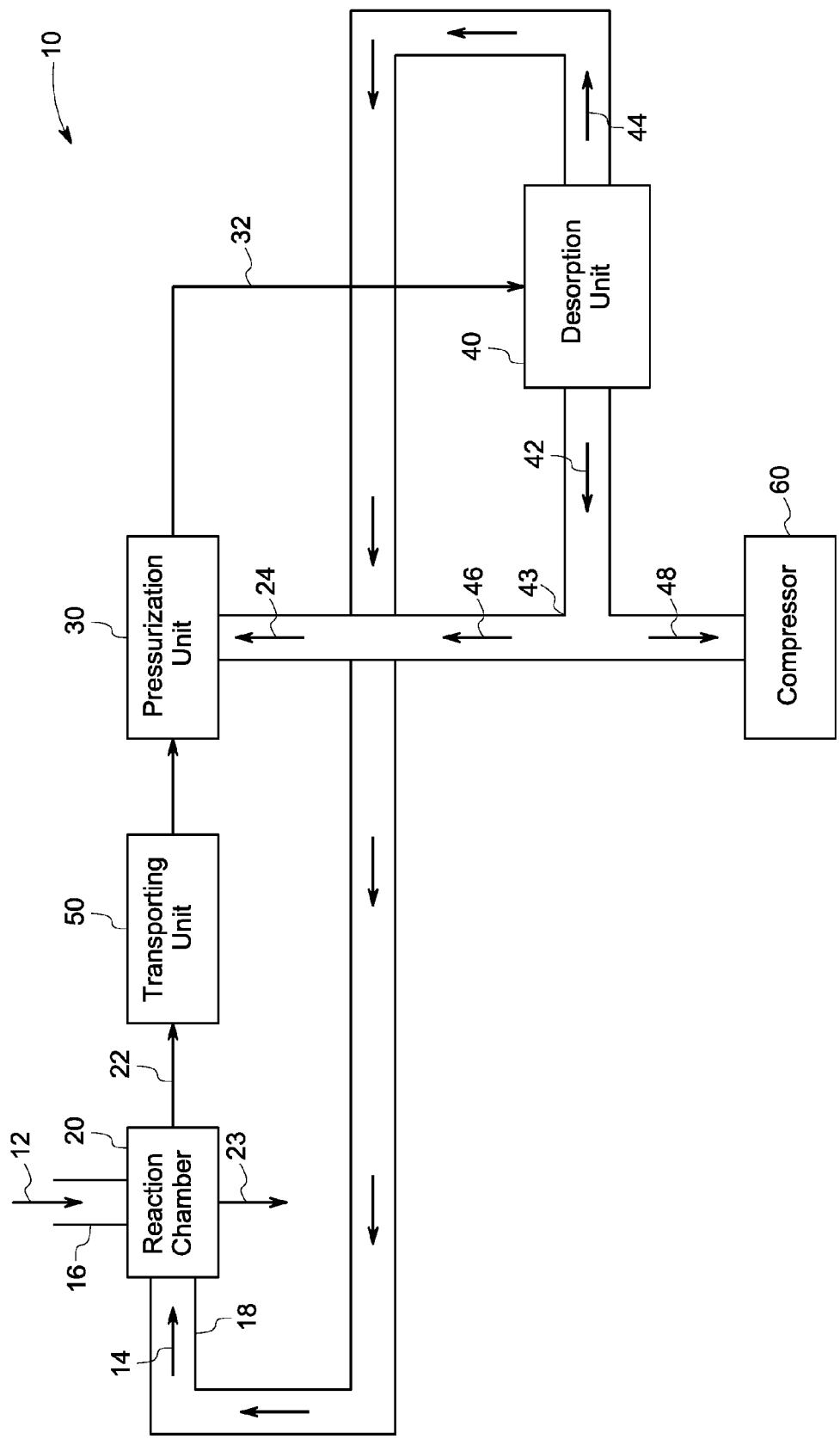
FIG. 2 is a schematic illustration of a system for CO$_2$ separation from a gas stream, in accordance with one embodiment of the invention.

In some embodiments, the reaction chamber 20 may receive the gas stream 12, via at least one inlet 16, as indicated in FIG. 2. In some embodiments, the gas stream 12 may be provided to the reaction chamber 20 via a plurality of inlets 16 (not shown), located at different positions in the reaction chamber 20. In some embodiments, the gas stream 12 may be further subjected to one or more processing steps (for example, removing water vapor, impurities, and the like) before providing the gas stream 12 to the reaction chamber 20.

The term "liquid sorbent stream" as used herein refers to a stream of liquid sorbent or a sorbent that is in a liquid state. In some embodiments, the liquid sorbent may be characterized by a melting temperature or a glass transition temperature lower than the operating temperature of the system 10.

In some embodiments, the liquid sorbent may include any suitable material capable of being converted to a solid by chemical reaction with carbon dioxide. In some embodiments, the liquid sorbent may include a monomer, an oligomer, a polymer, or combinations thereof. In some embodiments, the liquid sorbent stream may include an amino siloxane compound. Suitable examples of liquid sorbents are described in patent application Ser. No. 12/343,905 (Genovese et al), filed on 24 Dec. 2008; Ser. No. 12/512,577 (Perry et al), filed on 30 Jul. 2009; and U.S. Pat. Nos. 8,030,509 and 8,747,694, all of which are incorporated by reference in their entirety, so long as not directly contradictory with the teachings herein.

In some embodiments, the liquid sorbent stream 14 may include an amino siloxane compound having a structure of formula (I):

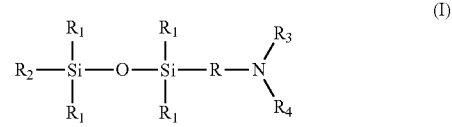

wherein R is a $C_1$-$C_6$ aliphatic radical; $R_1$ is independently at each occurrence a $C_1$-$C_8$ aliphatic or aromatic radical; $R_2$ is $R_1$ or $RNR_3R_4$, wherein $R_3$ and $R_4$ are independently at each occurrence a bond, hydrogen, or a $C_1$-$C_8$ aliphatic radical.

As used herein, the term "aromatic radical" refers to an array of atoms having a valence of at least one comprising at least one aromatic group. The array of atoms having at least one aromatic group may include heteroatoms such as nitrogen, sulfur, selenium, silicon and oxygen, or may be composed exclusively of carbon and hydrogen.

As used herein the term "aliphatic radical" refers to an organic radical having a valence of at least one consisting of a linear or branched array of atoms, which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like.

Some non-limiting examples of the amino siloxane compounds that may be used as the liquid sorbent include 1,3-bis((N-2-aminoethyl)-3-aminopropyl)-1,1,3,3-tetramethyldisiloxane, 1,3,5,7-tetrakis(3-aminopropyl)-1,3,5,7-tetramethylcyclotetrasiloxane, tetrakis(3-aminopropyldimethylsiloxy)silane, 1,5-bis(3-aminopropyl)-1,1,3,3,5,5-hexamethyltrisiloxane,1,3,5-tris(3-aminopropyl)-1,1,3,5,5-pentamethyltrisiloxane, tris(3-aminopropyldimethylsiloxy)-3-aminopropylsilane, 4,4-bis(aminomethyl)-2,2,6,6-tetramethyl-1,2,6-oxadisilinane, or any combinations thereof.

In some embodiments, the amino siloxane includes a structure of formula (II), wherein "Me" is a methyl group.

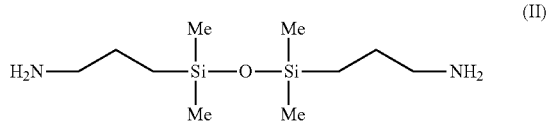 [SMILES: C[Si](C)(CCCN)O[Si](C)(C)CCCN]
(II)

As mentioned above, in some embodiments, the liquid sorbent stream 14 is substantially free of an additional solvent or a carrier. The term "substantially free" as used herein means that the amount of co-solvent or a carrier fluid in the liquid sorbent stream is less than 10 volume percent. In some embodiments, the amount of co-solvent or a carrier fluid in the liquid sorbent stream is less than 5 volume percent. In some embodiments, the liquid sorbent stream is substantially free of a solvent selected from the group consisting of water, ionic liquids, and combinations thereof. In some embodiments, the system 10 is configured to utilize a non-aqueous liquid sorbent stream 14 for separating $CO_2$ from the gas stream 12.

As noted earlier, conventional $CO_2$ sorbent systems utilize sorbents mixed with a non-absorbing carrier fluid (such as, for example, water or glycol), which leads to increase in volume of the sorbent stream and simultaneous reduction in absorption capacity of the sorbent stream by volume. Accordingly, the conventional $CO_2$ separation systems require larger reactor capacities (which may lead to increase in capital cost) and also require additional energy to pump, heat, and cool the carrier fluid (which may lead to increase in operating cost). In contrast, by using liquid sorbents, in accordance with some embodiments of the invention, use of co-solvent or carrier fluids may be excluded, which may lead to efficient and cost-effective $CO_2$ separation systems. Further, by not diluting the sorbent, a step in the process and the system equipment associated therewith may be excluded.

In some embodiments, the reaction chamber 20 may receive the liquid sorbent stream 14, via at least one inlet 18, as indicated in FIG. 2. In some embodiments, the liquid sorbent stream 14 may be provided to the reaction chamber 20 via a plurality of inlets 18 (not shown), located at different positions in the reaction chamber 20. In some embodiments, the system 10 may further include a liquid sorbent source (not shown) in fluid communication with the inlet 18 of the reaction chamber 20. In some embodiments, the liquid sorbent stream 14 in the reaction chamber 20 may include a plurality of liquid sorbent particles or droplets.

In some embodiments, the inlet 16 for the gas stream 12 may be located in a lower region (not shown) of the reaction chamber 20, relative to the inlet 18 for the liquid sorbent stream 14. In some embodiments, the gas stream 12 is advantageously provided to the reaction chamber 20 at a location such that an induced countercurrent flow exposes the gas stream, when it has the lowest $CO_2$ concentration, to the freshest liquid sorbent. Further, the gas stream 12 with the highest $CO_2$ concentration is exposed to the liquid sorbent stream 14 that has substantially reacted with the $CO_2$. Furthermore, in some embodiments, this type of flow scheme may permit the resulting solid material to agglomerate more readily, leading to faster solidification.

In some embodiments, the flow rate of the gas stream 12 entering the reaction chamber 20 may be chosen to enable the desired $CO_2$ removal, for example, to provide a sufficient residence time to reduce the $CO_2$ level in the gas stream to a desired level. In some embodiments, the inlet pressure of the gas stream may depend on the design and operating conditions of the reaction chamber 20 as well as the type of atomizer, as described below.

In some embodiments, the reaction chamber 20 is configured to provide contact between the liquid sorbent stream 14 and the gas stream 12 such that reaction of the liquid sorbent with the $CO_2$ of the gas stream 12 can occur.

In some embodiments, the reaction chamber 20 is configured to operate under the desired reaction conditions (for example, temperature and pressure) depending on the specific liquid sorbent utilized. In some embodiments, the reaction chamber 20 may be configured to operate at atmospheric pressure. In some embodiments, the reaction chamber 20 may be configured to operate at a temperature in a range from about 20 degrees Celsius (° C.) to about 70° C. Non-limiting examples of suitable reaction chambers may include a spray tower, a venturi scrubber, a multistage spray absorber, or combinations thereof. Moreover, the reaction chamber 20 may have a vertical, horizontal, or any tilted orientation. In some embodiments, the system 10 may further be configured to subject the liquid sorbent stream 14 to a dispersing mechanism (not shown) such that the liquid sorbent stream 14 is converted to a plurality of liquid sorbent particles in the reaction chamber 20.

In some embodiments, an atomizer (not shown) may be disposed in fluid communication with the reaction chamber 20 to disperse the liquid sorbent stream 14 into droplets. Suitable examples of atomizers may include a nozzle, an orifice, or combinations thereof. In some embodiments, an atomizing gas (for example, air) may be supplied to the reaction chamber 20. Alternatively, or in addition, the atomizer may be designed to atomize the liquid sorbent due to the pressure of the reaction chamber 20 and the atomizer inlet size into the reaction chamber 20. In some embodiments, the atomizer may be located near the liquid sorbent inlet 14. In some embodiments, the atomizer may be co-located with the inlet 18 or alternately may be incorporated into a portion of the inlet 18. In some further embodiments, a plurality of atomizers (for example, nozzles) may be positioned in the reaction chamber 20 at different heights, to maximize the spatial distribution of the sorbent droplets.

In some embodiments, the selected size for the liquid sorbent particles may depend on various factors, such as the composition of the sorbent (e.g., the reactivity of the sorbent with $CO_2$), and the type and design of the reaction chamber 20. The droplet size is normally a balance between maximizing the surface area for contact with the $CO_2$, and providing a sufficient mass for solid particle formation and preventing formed solid particles from being carried out of the reaction chamber in the gas stream. In some embodiments, an average diameter of the plurality of liquid sorbent particles is less than or equal to about 1,000 micrometers (μm). In some embodiments, an average diameter of the plurality of liquid sorbent particles is in a range from about 10 micrometers to about 100 micrometers.

As alluded to above, in some embodiments, the reaction chamber 20 is configured to react at least a portion of $CO_2$ in the gas stream 12 with the liquid sorbent stream 14 to form an adduct stream 22 including a solid $CO_2$ adduct, and a lean gas stream 23.

The term "solid $CO_2$ adduct" as used herein refers to a solid reaction product of liquid sorbent and $CO_2$. In some embodiments, the solid $CO_2$ adduct may include a carbamate compound, a bicarbonate compound, or combinations thereof. In some embodiments, as mentioned previously, the chemical reaction between the $CO_2$ in the gas stream 12 and the liquid sorbent droplets results in the formation of solid $CO_2$ adduct particles. The term "adduct stream" as used herein refers to a gas stream carrying or transporting the plurality of solid $CO_2$ adduct particles. In some embodiments, in addition to the solid $CO_2$ adduct particles, the adduct stream 22 may further include unreacted $CO_2$ gas, unreacted liquid sorbent droplets, water, or combinations thereof.

In some embodiments, one or more of size, shape, and density of the plurality of solid $CO_2$ adduct particles depends on one or more of size of the liquid sorbent droplets, the content of the liquid sorbent, the residence time within the reaction chamber, or the gas stream flow rate. In some embodiments, the plurality of solid $CO_2$ adduct particles are small enough to solidify to at least a non-sticky surface texture, but large enough to provide a sufficient mass for effective transport out of the reaction chamber 20. In some embodiments, an average particle size of the plurality of solid $CO_2$ adduct particles is less than or equal to about 1000 micrometers. In some embodiments, the plurality of solid $CO_2$ adduct particles may be spherical or substantially spherical in shape. The average particle density of the plurality of solid $CO_2$ adduct particles is in the range of about 1.1 grams per cubic centimeter to about 1.5 grams per cubic centimeter, in some embodiments.

In some embodiments, at least about 40 percent by volume of the $CO_2$ in the gas stream 12 reacts with the liquid sorbent in the reaction chamber 20. In some embodiments, at least about 60 percent by volume of the $CO_2$ in the gas stream 12 reacts with the liquid sorbent in the reaction chamber 20. In some embodiments, at least about 90 percent by volume of the $CO_2$ in the gas stream 12 react with the liquid sorbent in the reaction chamber 20.

As mentioned earlier, the system further includes a pressurization unit disposed between the reaction chamber 20 and the desorption unit 40. In some embodiments, the pressurization unit 30 is in fluid communication with the reaction chamber 20, and is configured to contact the adduct stream 22 with a pressurized $CO_2$ stream 24. In some embodiments, the pressurization unit 30 may be in fluid communication with the reaction chamber 20 via at least one outlet (not shown) of the reaction chamber 20. In some embodiments, the method may include contacting the adduct stream 22 with a pressurized $CO_2$ stream 24 in the pressurization unit 30, as indicated in FIG. 1. In some embodiments, the method includes contacting the adduct stream 22 with the pressurized $CO_2$ stream 24 thereby liquefying at least a portion of the solid $CO_2$ adduct of the adduct stream 22 and forming a pressurized adduct stream 32 that includes a liquid $CO_2$ adduct.

Without being bound by any theory, the inventors believe that the pressure in the pressurization unit 30 depresses the melting point of the solid $CO_2$ adduct in the adduct stream 22, and liquefies at least a part of the solid $CO_2$ adduct, thereby improving the ease of handling of the adduct stream 22. In some embodiments, the pressure of the pressurization unit 30 may be greater than the pressure required to liquefy at least 10 volume % of the solid $CO_2$ adduct in the adduct stream 22. In some embodiments, the pressure of the pressurization unit may be greater than the pressure required to liquefy at least 50 volume % of the solid $CO_2$ adduct in the adduct stream 22. In some embodiments, the pressure of the pressurization unit 30 may be equal to or more than the pressure required to liquefy at least 80 volume % of the solid $CO_2$ adduct in the adduct stream 22. In some embodiments, the pressure of the pressurization unit is greater than 80 psi.

In some embodiments, the pressurization unit 30 may be configured to pressurize the incoming adduct stream 22. In some embodiments, the pressurization unit may be configured such that the incoming pressurized $CO_2$ stream 24 pressurizes the incoming adduct stream 22. In some other embodiments, both the pressurization unit 30 and the incoming pressurized $CO_2$ stream 24 may pressurize the adduct stream 22.

In some embodiments, the method may further include transferring the adduct stream 22 to the pressurization unit 30. In some embodiments, as illustrated in FIG. 2, the system 10 may further include a transporting unit 50 that is configured to transfer the adduct stream 22 from the reaction chamber 20 to the pressurization unit 30. The transporting unit 50 may be configured to transport the adduct stream 22 without the addition of liquids, in some embodiments. In some embodiments, the transporting unit 50 may represent a dry pressurization system configured to transport the adduct stream 22 to the pressurization unit 30. In some embodiments, the transporting unit 50 may be configured to transport the adduct stream 22 from a near-atmospheric reaction chamber 20 to the pressurization unit 30. In some embodiments, the transporting unit 50 may be configured to pressurize the adduct stream 22 during transportation to the pressurization unit 30.

The transporting unit 50 may deliver the adduct stream 22 to the pressurization unit 30 in a continuous or semi-continuous manner. Exemplary semi-continuous transport mechanisms of the transporting unit 50 for use in the dry transport and optional pressurization of the adduct stream 22 can include, without limitation, a rotary valve, a piston pump, a solids pump, a screw conveyor, and the like. In some embodiments, the transportation unit may include a solids pump e.g., GE Posimetric™ pumps commercially available from General Electric Company. Optionally, the adduct stream 22 may be transported using a combination including at least one of the foregoing transportation mechanisms.

In some embodiments, the transporting unit 50 and the pressurization unit 30 may be integrated with each other to form a combined transporting pressurization unit (as shown in FIG. 1). In such embodiments, the adduct stream 22 may be contacted with the pressurized $CO_2$ stream 24 in the combined transporting pressurizing unit. Non-limiting examples of suitable combined transporting pressurizing units include a lock hopper, an extruder, or a combination thereof. In certain embodiments, the combined transporting pressurization unit includes an extruder.

In some embodiments, where an extruder is used as the combined transporting pressurization unit, the pressurized $CO_2$ stream 24 may be injected into a barrel of the extruder to promote melting of the solid $CO_2$ adduct at low temperature, which may improve seal stability of the solid in the extruder and may further enable the extruder to operate at lower heat input rates or temperatures. This is particularly advantageous in scaling up the extruder. Typically, as extruders are scaled up, a heat transfer area of the extruder available to heat the adduct stream 22 may not scale up similar to the scale up in the processing volume of the extruder, which may result in reduced heat transfer efficiency of large extruders compared to small extruders. Instigating melting point depression of the solid $CO_2$ adduct in the extruder barrel may help to increase heat transfer at a large scale.

In some embodiments, the system 10 may further include an optional cyclone (not shown). The cyclone can be disposed between the reaction chamber 20 and the transporting unit 50. The cyclone may be configured to separate the solid particles from the "scrubbed" gas stream (i.e., the gas stream from which the $CO_2$ has been removed to the desired level (e.g., that is substantially free of $CO_2$).

The term "pressurized $CO_2$ stream" as used herein refers to a $CO_2$ stream having a pressure greater than atmospheric pressure. In some embodiments, the pressure of the pressurized $CO_2$ stream 24 may be greater than 7 atmosphere (atm). In some further embodiments, the pressure of the pressurized $CO_2$ stream may be in a range from about 5 atm to about 11 atm. Various sources of $CO_2$ and methods of pressurization available in the art may be used for providing the pressurized $CO_2$ stream to the pressurization unit 30. In some embodiments, $CO_2$ produced from any combustion process, a gasification process, a steam generator, a boiler, or combinations thereof may be pressurized and used as the pressurized $CO_2$ stream 24. In some embodiments, the pressurized $CO_2$ stream 24 may be a recirculated stream from the desorption unit 40 of the system 10. In some embodiments, the pressurized $CO_2$ stream 24 is substantially free of any other gases or liquids, wherein the term "substantially free" means that the amount of any other gases or liquids in the pressurized $CO_2$ stream 24 is less than 5 volume percent. The pressurized $CO_2$ may be in a gaseous form or liquid form. In some embodiments, the pressurized $CO_2$ stream 24 is in the gaseous form.

In some embodiments, the pressurized $CO_2$ stream 24 contacts the adduct stream 22 in the pressurization unit 30 to liquefy at least a portion of the solid $CO_2$ adduct and form a pressurized adduct stream 32 including a liquid $CO_2$ adduct.

The term "pressurized adduct stream" as used herein refers to an adduct stream having a pressure that is greater than the adduct stream 22. Further, the pressurized adduct stream 32 may include liquefied adduct (from the adduct stream 22), solid $CO_2$ adduct, and liquid $CO_2$ (from the pressurized $CO_2$ stream 24). In some embodiments, the pressurized adduct stream 32 may further include gaseous $CO_2$.

Depending on the pressure of the pressurization unit and the amount of pressurized $CO_2$ stream 24 contacted with the adduct stream 22, in some embodiments, at least 10 volume % of the solid $CO_2$ adduct may be liquefied in the pressurization unit 30. In some embodiments, from about 30 volume % to about 100 volume % of the solid $CO_2$ adduct may be liquefied in the pressurization unit 30. In some embodiments, an amount of the solid $CO_2$ adduct that may be liquefied in the pressurization unit 30 may be in a range from about 50 volume % to about 100 volume %. In some embodiments, substantially all of the solid $CO_2$ adduct in the adduct stream may be liquefied in the pressurization unit 30.

As mentioned above, pressurizing the adduct stream in the pressurization unit 30 reduces melting point of the solid $CO_2$ adduct. For example, in some embodiments, if a solid carbamate salt of the solid $CO_2$ adduct has a melting point greater than 90° C. in air at atmospheric pressure, the solid carbamate salt may melt at a temperature lower than 50° C. in the pressurization unit 30 to form the pressurized adduct stream 32. Presence of liquid $CO_2$ adduct in the pressurized adduct stream 32 enhances the transportability of the pressurized $CO_2$ stream to the desorption unit 40, without the need of any further carrier solvents and may further aid in decreasing the energy expended for transporting solids to the desorption unit 40. Further, by using pressurized $CO_2$ to liquefy the solid $CO_2$ adduct in the adduct stream 22, additional co-solvents or carrier fluids with the liquid sorbent may not be required, thereby obviating the need for any secondary separation and avoiding reduction in $CO_2$ capture capacity of the liquid sorbent.

In some embodiments, the desorption unit 40 is in fluid communication with the pressurization unit 30. The desorption unit 40 is configured to receive the pressurized adduct stream 32, and to decompose at least a portion of the liquid $CO_2$ adduct of the pressurized adduct stream 32 to form a $CO_2$ stream 42 and a regenerated liquid sorbent stream 44. In some embodiments, the desorption unit 40 is configured to decompose at least a portion of solid $CO_2$ adduct (if present) in the pressurized adduct stream 32, along with decomposing at least a portion of the liquid $CO_2$ adduct to form the $CO_2$ stream 42. In some embodiments, the pressurization unit 30 delivers the pressurized adduct stream 32, under pressure, to the desorption unit 40. In some embodiments, the pressure of the pressurized adduct stream 32 is suitable for injection into the desorption unit (that is, greater than the desorption pressure). Pumps that are effective for delivering pressurized adduct stream 32 to the desorption unit 40 as described herein will be well known to those having skill in the art and are commercially available. In some embodiments, by delivering the pressurized adduct stream 32 under pressure, the compression duty needed for $CO_2$ desorption may be reduced.

In some embodiments, the method further includes heating at least a portion of the pressurized adduct stream 32 in the desorption unit 40. In some embodiments, the method includes heating the pressurized adduct stream 32 in the desorption unit 40 to form the $CO_2$ stream 42 and the regenerated liquid sorbent stream 44.

Typically the temperature of the desorption unit 40 is greater than or equal to the decomposition temperature of the liquid $CO_2$ adduct. However, the temperature should not be excessively high, i.e., requiring excessive energy use; or possibly resulting in decomposition of the sorbent to byproducts which may be difficult to handle in the overall process. Generally, the sorbent can be regenerated and the $CO_2$ released from the adduct at certain pressure and temperature combination of the desorption unit 40. In some embodiments, the desorption temperature may depend on the composition and size of the particles of the $CO_2$ adduct; the amount of $CO_2$ bound within the adduct; the decomposition temperature of the liquid sorbent; and pressure conditions within the desorption unit 40. In some embodiments, a desorption temperature of the desorption unit 40 may be greater than 70° C. and less than the decomposition temperature of the liquid sorbent. For example, in some embodiments where the adduct stream 22 includes carbamates, bicarbonates, or related compositions, the desorption temperature may be in a range from about 80° C. to about 150° C.

In some embodiments, the $CO_2$ stream 42 and the liquid sorbent stream 44 are generated in the desorption unit 40 at a pressure greater than or equal to 1 atm. In some embodiments, the pressure of the desorption unit 40 during operation is greater than or equal to 2 atm. In some specific embodiments, the pressure of desorption unit may be in a range from about 5 atm. to about 10 atm. In some embodiments, a pressure induced in the desorption unit 40 by the introduction of the pressurized adduct stream 32 may be sufficient to decompose the pressurized adduct stream 32 into the $CO_2$ stream 42 and the regenerated liquid sorbent stream 44, under the temperature conditions described above. In some other embodiments, pressure of the desorption unit 40 may be reduced for the regeneration of $CO_2$ and the liquid sorbent. In some embodiments, the $CO_2$ stream 42 and the liquid sorbent stream 44 may be generated in the desorption unit 40 at a pressure in a range from about 1 atm to about 4 atm. Exemplary desorption units 40 for use in the system 10 may include, without limitation, continuous stirred tank reactors (CSTR), plug flow reactor (PFR), flash units, and similar desorption vessels.

By using the systems and methods in accordance with the embodiments of the invention, the heating duty for desorption of the liquefied adduct (introduced as pressurized adduct stream) in the desorption unit may be lower compared to the systems that involve introduction of the adduct stream to the desorption unit as a dry solid. Further, as mentioned above, by using systems and methods in accordance with embodiments of the invention, additional co-solvent or carrier fluids may not be required to transport the adduct from the reaction chamber to the desorption unit. Therefore, there is lower energy expended in the desorption unit and further the need for separating the co-solvent/carrier fluid is obviated.

In some embodiments, the method may include separating at least about 60 weight % of the $CO_2$ from the adduct in the desorption unit 40. In some embodiments, the method may include separating $CO_2$ in a range from about 80 weight % to about 99 weight % of the $CO_2$ from the adduct. In some embodiments, the method may include separating substantially all of the $CO_2$ from the adduct in the desorption unit 40.

Referring again to FIGS. 1 and 2, in some embodiments, the method includes discharging at least a portion of the desorbed $CO_2$ to form a $CO_2$ stream 42. In some embodiments, the $CO_2$ stream 42 may include substantially pure $CO_2$ gas, or alternately may further include impurities, such as additional absorbed gases or sorbent. The $CO_2$ stream 42 may be discharged or otherwise directed out of the desorption unit 40 from at least one discharge outlet 43 (or multiple conduits) as shown in FIG. 2. The $CO_2$ released from the desorption unit 40 may be a combination of the $CO_2$ released from the adduct stream 22 and the $CO_2$ that was added to from the pressurized $CO_2$ stream.

In certain embodiments, the system 10 may further include a $CO_2$ recirculation unit 45 that is configured to recirculate at least a portion of the $CO_2$ stream 42 that is released from the desorption unit 40 to the pressurization unit 30, as shown in FIG. 2. In some embodiments, the method may include circulating the slipstream 46 of the $CO_2$ stream 42 to the pressurization unit 30, as indicated in FIG. 2. In such embodiments, the slipstream 46 may be itself the pressurized $CO_2$ stream 24 (as indicated in FIG. 2); or is combined with a separate pressurized $CO_2$ stream 24 (not shown), or may be added to the pressurization unit 30 as a separate feed, along with the pressurized $CO_2$ stream 24 (not shown). In some embodiments, the pressure of the $CO_2$ stream 42, or the slipstream 46, as the case may be, is equivalent to or greater than the pressure required for the pressurization of the adduct stream 22 in the pressurization unit 30. In some other embodiments, the $CO_2$ stream 42 or the slipstream 46 may be further pressurized before introducing to the pressurization unit 30. In certain embodiments, the system 10 may include the $CO_2$ recirculation unit 45 that is configured to pressurize at least a portion of the $CO_2$ stream 42 to form the pressurized $CO_2$ stream 24 and circulate the pressurized $CO_2$ stream 24 to the pressurization unit 30. In some such embodiments, the method may include pressurizing at least a portion of the $CO_2$ stream 42 to form the pressurized $CO_2$ stream 24, and recirculating the pressurized $CO_2$ stream 24 to the pressurization unit 30.

In some embodiments, a portion 48 of the regenerated $CO_2$ stream 42 may be discharged from the desorption unit 40; or the stream 48 may be compressed (for example in a compressor 60), as indicated in FIG. 2; or purified, for example, for re-use, or for transport to an end-use location. In some embodiments, the $CO_2$ stream 42 (as shown in FIG. 1), or the stream 48 (as shown in FIG. 2), may be used for enhanced oil recovery, $CO_2$ storage, or $CO_2$ sequestration.

As mentioned above, the desorption unit 40 is also configured to regenerate the liquid sorbent 14. In some embodiments, the regenerated liquid sorbent stream 44 can be directed to treatment, storage, or disposal facilities. In some embodiments, at least a portion of the regenerated liquid sorbent stream 44 may be directed back to reaction chamber 14, as indicated in FIG. 2, through one or more conduits (not shown). One or more pumps (not shown) may be used to pump the regenerated liquid sorbent stream 44 back to the reaction chamber 20.

In some embodiments, the method may include circulating at least a portion of the regenerated liquid sorbent stream 44 to the reaction chamber 20, as indicated in FIG. 2, to further react with $CO_2$ from the gas stream, thereby forming $CO_2$-bound adduct stream 22 in a closed loop process. In such embodiments, the liquid sorbent stream 14 is the regenerated liquid sorbent stream 44, and a separate liquid sorbent source may not be required. In some embodiments the regenerated liquid sorbent stream that is circulated to the reaction chamber 20 may be a slip stream (not shown) of the liquid sorbent stream 44 that is generated in the desorption unit 40. In some embodiments, the regenerated liquid sorbent stream 44 may be combined with a separate liquid sorbent stream 14 (not shown). In some embodiments, the liquid sorbent stream 14 may include one or both of fresh liquid sorbent and regenerated liquid sorbent. In some embodiments, the liquid sorbent stream 14 may include at least a portion of regenerated liquid sorbent stream 44 from the desorption unit 40.

Figure 3:
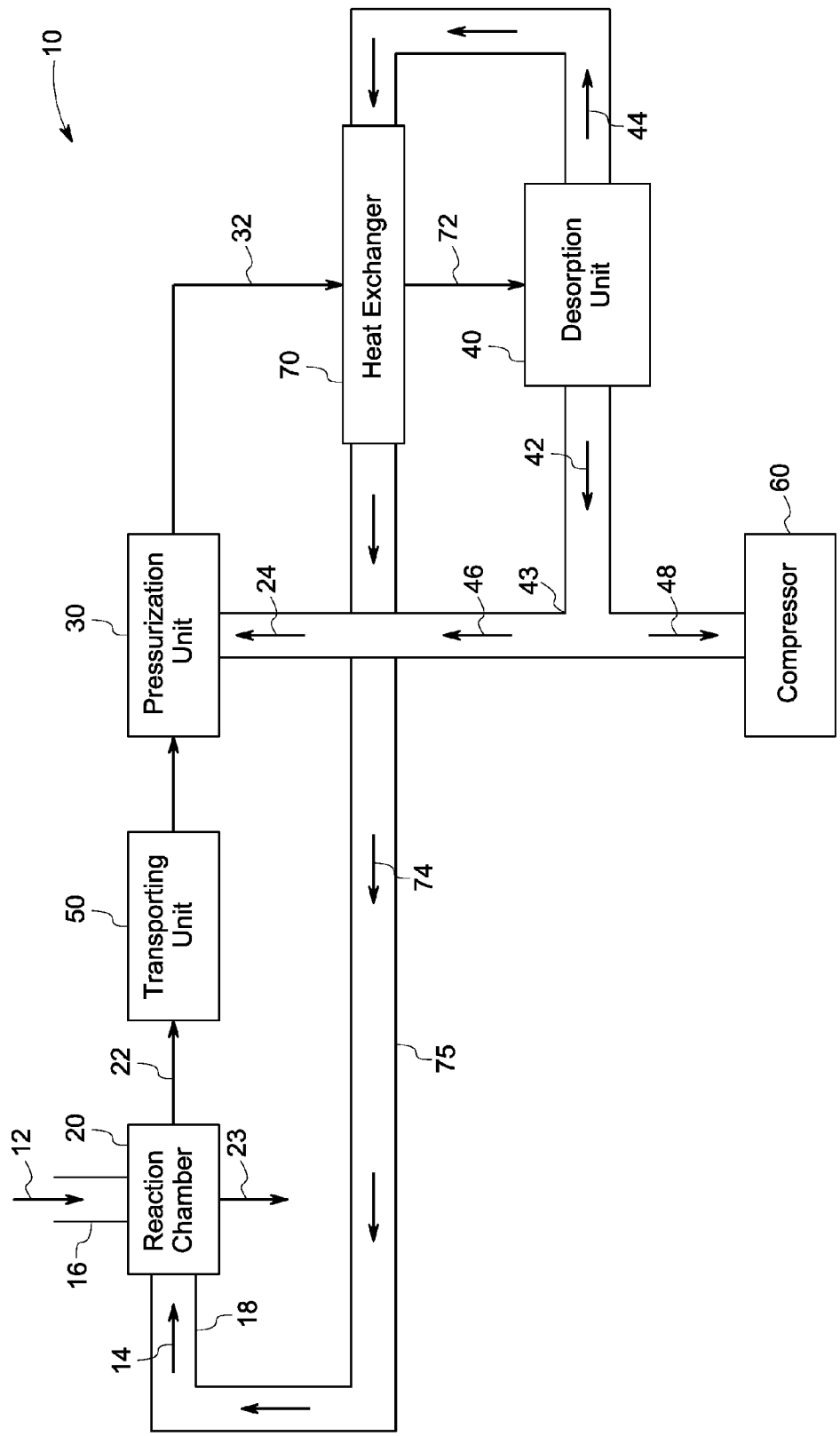
FIG. 3 is a schematic illustration of a system for CO$_2$ separation from a gas stream, in accordance with one embodiment of the invention.

Turning now to FIG. 3, in some embodiments, a system 10 and a method for separating $CO_2$ from the gas stream 12 is provided. The system and the method is similar to the system and method described above with reference to FIGS. 1 and 2, with the addition that the system 10 further includes one or more heat exchangers 70 in fluid communication with the pressurized adduct stream 32. In some embodiments, the heat exchanger 70 may be disposed downstream of the pressurization unit 30 and upstream of the desorption unit 40, and may be configured to exchange heat between the pressurized adduct stream 32 and the regenerated liquid sorbent stream 44. In some embodiments, the heat exchanger 70 is in fluid communication with the pressurized adduct stream 32 and the regenerated liquid sorbent stream 44. In some embodiments, the regenerated liquid sorbent stream 44 may be at a higher temperature than the pressurized adduct stream 32 after the heating and desorption step in the desorption unit 40. In some embodiments, the regenerated liquid sorbent stream 44 may transfer some of the heat to the pressurized adduct stream 32 prior to directing the pressurized adduct stream 32 to the desorption unit 40. Thus, in some embodiments, the method may include pre-heating the pressurized adduct stream 32 via heat exchange with the regenerated liquid sorbent stream 44 to form a pre-heated pressurized adduct stream 72 and a cooled regenerated liquid sorbent stream 74, as shown in FIG. 3.

In some embodiments, the method further may include recirculating at least a portion of the cooled regenerated liquid sorbent stream 74 to the reaction chamber 20 thereby using the cooled regenerated liquid sorbent stream 74 as the liquid sorbent stream 14, or in addition to the liquid sorbent stream 14. In some embodiments, a liquid sorbent recirculation unit 75 is used for circulating at least a portion of a cooled regenerated liquid sorbent stream 74 to the reaction chamber 20.

Efficiency of heat exchange within the $CO_2$ capture process may contribute to the overall efficiency of the process. Specifically, heat exchange between the hot regenerated liquid sorbent 44 exiting the desorption unit 40 and the $CO_2$ adduct entering the desorption unit 40 from the pressurization unit 30 may contribute to the overall process efficiency. This heat exchange is challenging with the solid $CO_2$ adduct, as there are limited means of heat exchange with bulk solids, and those that exist are difficult to employ with solids that melt. By liquefying the solid $CO_2$ adduct, heat exchange between the hot regenerated liquid sorbent stream 44 and the pressurized adduct stream 32 can be accomplished in a fluid/fluid heat exchanger with improved efficiency relative to a fluid/solids heat exchanger.

In some embodiments the system may include multiple heat exchangers and multiple streams of the regenerated liquid sorbent streams 44, or any other streams at higher temperature than the pressurized adduct stream 32, and engage the heat exchangers in a series or parallel manner for effective pre-heating of the pressurized adduct stream 32.

With the foregoing in mind, methods for separating $CO_2$ from a gas stream, according to some embodiments of the invention, are further described herein. In some embodiments, a method for separating $CO_2$ from a gas stream 12 is provided as illustrated in FIG. 3. The method includes contacting the liquid sorbent stream 14 with the gas stream 12, reacting at least a portion of $CO_2$ in the gas stream 12 with the liquid sorbent stream 14 to form an adduct stream 22 that includes a solid $CO_2$ adduct. The method further includes contacting the adduct stream 22 with the pressurized $CO_2$ stream 24 in the pressurization unit 30, thereby liquefying at least a portion of the solid $CO_2$ adduct and forming the pressurized adduct stream 32 that includes a liquid $CO_2$ adduct. The method further includes pre-heating the pressurized adduct stream 32 in a heat exchanger 70 via heat exchange with the regenerated liquid sorbent stream 44 to form the pre-heated pressurized adduct stream 72 and the cooled regenerated liquid sorbent stream 74. The method further includes heating the pre-heated pressurized adduct stream 72 in the desorption unit 40 to decompose at least a portion of the liquid $CO_2$ adduct to form the $CO_2$ stream 42 and the regenerated liquid sorbent stream 44, pressurizing at least a portion of the $CO_2$ stream 42 to form the pressurized $CO_2$ stream 24 and recirculating the pressurized $CO_2$ stream 24 for contacting with the adduct stream 22 in the pressurization unit 30, and recirculating at least a portion of the cooled regenerated liquid sorbent stream 74 to the reaction chamber 20.

As noted earlier, the liquid sorbent based $CO_2$ separation systems and methods in accordance with embodiments of the invention may advantageously provide for energy-efficient and cost-effective capture of $CO_2$. In some embodiments, energy may be saved by using the pressurized $CO_2$ stream 24 to form the pressurized adduct stream 32 that includes a liquid $CO_2$ adduct, and thus facilitating easy transportation of the $CO_2$ adduct to the desorption unit. Therefore, the systems and methods in accordance with embodiments of the invention obviate the need to pump, heat, or cool the larger volumes of fluid used by systems employing non-absorbing co-solvents different from the sorbent, 40. Further, presence of liquid $CO_2$ adduct in the pressurized adduct stream 32, in some embodiments, improves heat transfer efficiency and decreases overall energy expenditure of the system 10. This may advantageously result in reduced materials and capital cost, increased efficiency, simplified $CO_2$ capture process, and reduce the overall footprint of the system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of separating carbon dioxide ($CO_2$) from a gas stream, comprising:
    contacting a liquid sorbent stream with the gas stream;
    reacting at least a portion of $CO_2$ in the gas stream with the liquid sorbent stream in a reaction chamber to form an adduct stream comprising a solid $CO_2$ adduct;
    contacting the adduct stream with a pressurized $CO_2$ stream, thereby liquefying at least a portion of the solid $CO_2$ adduct and forming a pressurized adduct stream comprising a liquid $CO_2$ adduct; and
    heating the pressurized adduct stream to decompose at least a portion of the liquid $CO_2$ adduct to form a $CO_2$ stream and a regenerated liquid sorbent stream.

2. The method of claim 1, further comprising pressurizing at least a portion of the $CO_2$ stream in a pressurization unit the pressurized $CO_2$ stream, and recirculating the pressurized $CO_2$ stream to the pressurization unit.

3. The method of claim 1, wherein the pressurized $CO_2$ stream has a pressure greater than 7 atm.

4. The method of claim 1, further comprising pre-heating the pressurized adduct stream via heat exchange with the regenerated liquid sorbent stream to form a pre-heated pressurized adduct stream and a cooled regenerated liquid sorbent stream.

5. The method of claim 4, further comprising recirculating at least a portion of the cooled regenerated liquid sorbent stream to the reaction chamber.

6. The method of claim 1, wherein the liquid sorbent comprises an amino siloxane compound.

7. The method of claim 6, wherein the amino siloxane compound has a structure of formula: $(NH_2C_3H_6Si(Me)_2OSiMe_2C_3H_6NH_2)$, wherein "Me" is a methyl group.

8. A method of separating carbon dioxide ($CO_2$) from a gas stream, comprising:
contacting a liquid sorbent stream with the gas stream in a reaction chamber;
reacting at least a portion of $CO_2$ in the gas stream with the liquid sorbent stream to form an adduct stream comprising a solid $CO_2$ adduct;
contacting the adduct stream with a pressurized $CO_2$ stream, thereby liquefying at least a portion of the solid $CO_2$ adduct and forming a pressurized adduct stream comprising a liquid $CO_2$ adduct;
pre-heating the pressurized adduct stream via heat exchange with a regenerated liquid sorbent stream to form a pre-heated pressurized adduct stream and a cooled regenerated liquid sorbent stream;
heating the pre-heated pressurized adduct stream to decompose at least a portion of the liquid $CO_2$ adduct to form a $CO_2$ stream and the regenerated liquid sorbent stream;
pressurizing at least a portion of the $CO_2$ stream to form the pressurized $CO_2$ stream and recirculating the pressurized $CO_2$ stream for contacting with the adduct stream; and
recirculating at least a portion of the cooled regenerated liquid sorbent stream to the reaction chamber.

* * * * *